(12) United States Patent
Mencher et al.

(10) Patent No.: US 6,270,544 B1
(45) Date of Patent: Aug. 7, 2001

(54) CYCLONE SEPARATOR HAVING A TUBULAR MEMBER WITH SLIT-LIKE OPENINGS SURROUNDING A CENTRAL OUTLET PIPE

(75) Inventors: Yury Mencher; Matitiahu Fichman, both of Haifa (IL)

(73) Assignee: Vortex Ecological Technologies Ltd., Mifratz Haifa (IL)

( * ) Notice: Subject to any disclaimer, the term of this patent is extended or adjusted under 35 U.S.C. 154(b) by 0 days.

(21) Appl. No.: 09/424,483

(22) PCT Filed: May 10, 1998

(86) PCT No.: PCT/IL98/00216

§ 371 Date: Nov. 23, 1999

§ 102(e) Date: Nov. 23, 1999

(87) PCT Pub. No.: WO98/52673

PCT Pub. Date: Nov. 26, 1998

(30) Foreign Application Priority Data

May 25, 1997 (IL) .......................................... 120907

(51) Int. Cl.[7] .......................... B01D 29/52; B01D 45/16; B01D 50/00
(52) U.S. Cl. ................... 55/318; 55/346; 55/416; 55/459.1; 55/455; 96/314
(58) Field of Search .................. 55/315, 318, 346, 55/349, 398, 459.1, 459.2, 459.3, 459.4, 459.5, 462, 416, 455; 96/314

(56) References Cited

U.S. PATENT DOCUMENTS

| 1,539,435 | * | 5/1925 | Schutz ..................................... 55/454 |
| 3,324,634 | | 6/1967 | Brahler et al. . |
| 3,370,408 | * | 2/1968 | Lehre et al. ......................... 55/459.4 |
| 4,229,194 | | 10/1980 | Baillie . |
| 4,904,281 | | 2/1990 | Raterman . |
| 5,163,786 | * | 11/1992 | Christianson .......................... 55/467 |
| 5,181,943 | * | 1/1993 | Weber ................................. 55/459.1 |
| 5,762,666 | | 6/1998 | Amrein et al. . |

FOREIGN PATENT DOCUMENTS

| 2281791 | | 3/1976 | (FR) . |
| 1623769 | * | 1/1991 | (RU) ................................... 55/459.1 |
| 1445806 | * | 12/1988 | (SU) ................................... 55/459.1 |

* cited by examiner

Primary Examiner—David A. Simmons
Assistant Examiner—Robert A. Hopkins
(74) Attorney, Agent, or Firm—Blank Rome Comisky & McCauley LLP

(57) ABSTRACT

A cyclone separator for separating a solid particulate from the gas or liquid medium is described. The separator is provided with a housing (H), an outlet (4) for discharging the solid particulate separated from the medium, a pipe (13) for evacuating the clean fluid from the housing (H) and a swirling means capable of imparting vortical motion to the medium. The swirling means is formed with a plurality of slit-like openings (16) arranged on the periphery thereof.

30 Claims, 5 Drawing Sheets

CYCLONE SEPARATOR HAVING A TUBULAR MEMBER WITH SLIT-LIKE OPENINGS SURROUNDING A CENTRAL OUTLET PIPE

FIELD OF THE INVENTION

The present invention relates to fluid cleaning processing.

More particularly, the present invention refers to cyclone separators for use in separating a solid particulate from the air. It should be understood, however, that the present invention is not limited to separation of a solid particulate from the air, but is also suitable for wet cleaning of other gases from either solid or gaseous contaminants.

BACKGROUND OF THE INVENTION

A general description of existing cyclone separators can be found in different books and monographs, for example, in the book *Principles of unit operations* by Alan S. Foust el al., John Wiley & Sons, 1985. A comprehensive survey of modern industrial air cleaning equipment can be found in the monograph "Separation of particles from air and gases" by Akira Ogava, CRC Press, 1984.

The existing industrial equipment suitable for dry or wet cleaning of polluted air can be generally divided into two groups.

The first group is based on imparting vortical motion to the fluid entering the cleaning vessel and separation of the solid particulate therefrom by virtue of centrifugal force. This group combines mechanical collectors, e.g. ordinary cyclones, mufti cyclones, and rotary flow dust collectors.

The second group is based on filtration of the air or on induced precipitation or gravitational settling of a solid particulate, without, however, involving the fluid within the cleaning vessel into the vortical movement. The industrial equipment relevant to this group includes bag filters and electrostatic precipitators.

The performance of existing particle collectors is evaluated according to the ultimate particle size of the solid particulate which can be separated by a collector.

From this point of view electrostatic precipitators are rather efficient devices enabling separation of very fine dust with a particle size lower that 0.01 micron. However, electrostatic precipitators are very costly; they operate only in the periodical mode and require that the particles to be separated be electrically conductive.

Venturi scrubbers can separate a particulate with particle size between 0.01 and 0.1 micron; however, their intrinsic disadvantage is associated with the necessity for a water supply and special measures for providing for a significant pressure drop required for normal operation of these devices. It can be appreciated that organization of the pressure drop is inevitably connected with additional energy expenses.

Bag filters are less expensive than venturi scrubbers or electrostatic precipitators. They are also capable of separating a particulate solid with particle size between 0.1 and 0.01 micron.

The disadvantage of bag filters is associated with the necessity in frequent maintenance due to the fact that filter fabric rapidly becomes greased. An additional disadvantage of bag filters is their limitation to operate at temperatures which are lower than temperatures of hot gases emitting during many industrial processes.

In contrast to the above mentioned types of separators the mechanical cyclone separators are versatile and low-cost devices which operate in a continuous mode and without the necessity of frequent maintenance measures. These devices have been successfully used for a very long time, both as stand-alone units, or in combination with the other types of separators. In the above mentioned monograph by Ogava there is mentioned, for example, a mechanical cyclone separator devised as early as in 1886.

Known-in-the-art cyclone separators are divided into tangential inlet cyclones and axial flow cyclones, depending on whether the feed enters the vessel tangentially with respect thereto or coaxially with respect to the longitudinal axis thereof In tangential flow cyclones the feed enters the cyclone chamber tangentially near the top thereof and it is involved in a spinning motion once it enters the chamber. The tangential velocity of the particles tends to carry them towards the periphery of the chamber. The spiral motion of the fluid results in some inward radial acceleration of the particle, and simultaneously, gravitational force imparts downward acceleration. The result is a downward movement of separated particles adjacent to the vessel wall and upward movement of the gas free of solids along the central region of the vessel interior.

Unfortunately, there are several problems associated with conventional tangential inlet cyclones. For very small sizes of dust less than 10 micron the energy represented by the tangential velocity is insufficient to overcome the centripetal force of the rotating fluid and the very fine dust can be picked up by the upward rotational flow of the gas.

In order to rectify the above defect the axial flow type cyclones were devised, in which the feed enters the vessel coaxially and rotational flow thereof is created by the guiding vanes. The solid particles are thrown on the vessel wall by the centrifugal force acting in the coaxial space. Unfortunately, the axial inlet flow cyclones have inferior efficiency in comparison with the tangential inlet cyclones due to the weak rotational gas flow organized by the guide vanes. This is why axial inlet flow cyclones are usually used in mufti-cyclones.

The main disadvantage of mechanical cyclone separators, in general, is their inability to separate fine solid particulate from the air, since neither available tangential inlet cyclones nor axial inlet cyclones have been so far effective in removing fine dust particulate, especially with a particle size of 1–10 microns.

There are known attempts to increase efficiency of tangential inlet cyclone separators by providing them with various guiding means similar to those used in axial inlet cyclones.

There is known, for example, a centrifugal separator, disclosed in SU 1468609. This device incorporates a vortex chamber with adjustable peripheral blades for imparting a vortical motion to the dust-laden air passing through the separator. Despite the fact that this separator provides for improved reliability of operation and facilitates its maintenance, it is suitable only for removing dust which is larger than 10 microns.

In SU 975099 there is disclosed an aerodynamic cyclone for gas scrubbing, comprising a cylindro-conical body, tangent gas inlet and axial offtake. Within the body there is provided a plurality of bent blades which stabilize vortical motion of the gas and improve evacuation of the solid particulate therefrom via the blade louvre grid towards annular space adjacent the inner surface of the body. The shortcoming of this cyclone separator lies in the fact that it is suitable for separation of particles only larger than 5 microns and is not efficient for separation of fine dust with particle size 1–2 microns.

In conclusion, it should be emphasized that despite the fact that different mechanical separating devices in general and cyclone separators in particular have been known for a long time the problem of cost effective and efficient separation of fine dust is still a vital one and there is still a need for a new and improved device which will ensure efficient and economical separation of fine dust from the air.

OBJECTS OF THE INVENTION

The object of the present invention is to provide for a new and improved cyclone separator which will sufficiently reduce or overcome the above mentioned drawbacks of the known-in-the-art separators.

In particular, the main object of the present invention is to provide for a new and improved cyclone separator suitable for efficient removal of particulate contaminants with particle size less than 10 microns from the solid laden air.

The second object of the present invention is to provide for a new and improved cyclone separator which is versatile and can be used both for dry and wet cleaning of gaseous industrial emissions from solid and liquid contaminants.

The third object of the present invention is to provide for a new and improved cyclone separator which is compatible with existing separators and can be easily integrated in an industrial line as an additional cleaning stage either before or after the existing cleaning stage.

The fourth object of the present invention is to provide for a new and improved cyclone separator capable of operating at temperatures associated with hot gases emitting in various industrial processes.

A still further object of the present invention is to provide for a new and improved cyclone separator having compact size which can be easily manufactured and does not require sophisticated maintenance.

The above and other objects and advantages of the present invention can be achieved in accordance with the following combination of its essential features, referring to different embodiments thereof.

A cyclone separator generally used for separation of particulate matter from solid laden gaseous fluid by virtue of vortical motion thereof, said separator comprising a housing defined by cylindrical peripheral wall thereof and by upper and lower extremities, said housing having a longitudinal axis and being provided with at least one inlet opening for entering said solid laden fluid thereinto, said inlet opening being formed within said peripheral wall and being directed preferably tangentially with respect thereto, an outlet means for discharging separated solid particulate from said housing, said outlet means being formed preferably as a hollow truncated cone, the large base thereof being in communication with the lower extremity of said housing and the small base thereof being in communication with appropriate collecting receptacle, a pipe means for evacuating the clean fluid from said housing, said pipe means being placed within said housing preferably coaxially with said longitudinal axis, at least one swirling means for imparting vortical motion to said fluid, said swirling means being formed as a tubular member, mounted within said housing coaxially with longitudinal axis of said housing so as to provide for annular space therebetween, said tubular member being provided with plurality of slit-like openings, formed in periphery thereof so as to enable communication between said annular space and the interior of said tubular member, wherein said openings are arranged regularly on the periphery of said member so as to extend substantially tangentially with respect to the interior thereof. Said openings are defined by a length and width dimension being chosen so as to provide for the total open area which is sufficient for imparting to the fluid entering the interior of said swirling means of intensive vortical motion, said vortical motion being defined by a linear velocity 60–100 m/sec, being preferably 60–70 m/sec.

In accordance with one of the preferred embodiments the length dimension of said openings is parallel to said longitudinal axis.

According to another preferred embodiment said tubular member is assembled from at least two modular units, each of said units being defined by a cylindrical peripheral wall thereof and by opposing upper and lower annular extremities thereof, wherein said slit-like openings are formed in the peripheral wall of said modular units, and their upper and lower extremities are provided with a mating means enabling the assembling of said modular units together.

As per still a further preferred embodiment, said mating means are formed as a protrusion and depression arranged respectively on said upper and lower opposite extremities, wherein annular protrusion of one modular unit is insertable within the corresponding annular depression of adjacent modular unit.

In yet another embodiment the openings of each modular unit are formed in two opposite regions of said periphery wall and are separated therebetween by an intermediate region, one of said opposite regions being adjacent to the upper extremity of said modular unit and the other opposite region being adjacent to the opposite lower extremity thereof.

In another preferred embodiment said swirling means is formed with a plurality of vanes, said vanes being arranged regularly along a circular path, preferably tangentially with respect thereto and said openings are formed by open spaces between the adjacent vanes.

According to still a further embodiment said housing is provided with a baffle means for evacuating of fine and medium particulate separated from said fluid, said baffle means is formed as cylindrical chamber having a diameter exceeding the diameter of said swirling means, said baffle means being mountable on the upper extremity of said housing so as to be in communication with the interior of said swirling means.

In accordance wiith another preferred embodiment said pipe means is provided with a baffle chamber for evacuating fine particulate separated from said fluid, said baffle chamber having a diameter exceeding the diameter of said pipe means.

According to still a further preferred embodiment said pipe means is provided with a retardation means for retardation of the vortical motion of said fluid, said retardation means preferably being mounted above said baffle chamber and provided with guiding vanes directed oppositely to the direction of the vortical motion of said fluid.

In another preferred embodiment the separator is provided with a liquid distributing means for wet cleaning of said fluid, said liquid distributing means being formed as a cylindrical chamber mountable on the upper extremity of said housing and being in communication with the interior of said housing, said cylidndrical chamber being provided with liquid supplying inlets for supplying said liquid thereinto.

The present invention in its various embodiments has only been briefly summarized.

For better understanding of the present invention as well of its advantages, reference will now be made to the following description of its embodiments.

DETAILED DESCRIPTION OF SPECIFIC EMBODIMENTS

Figure 1:
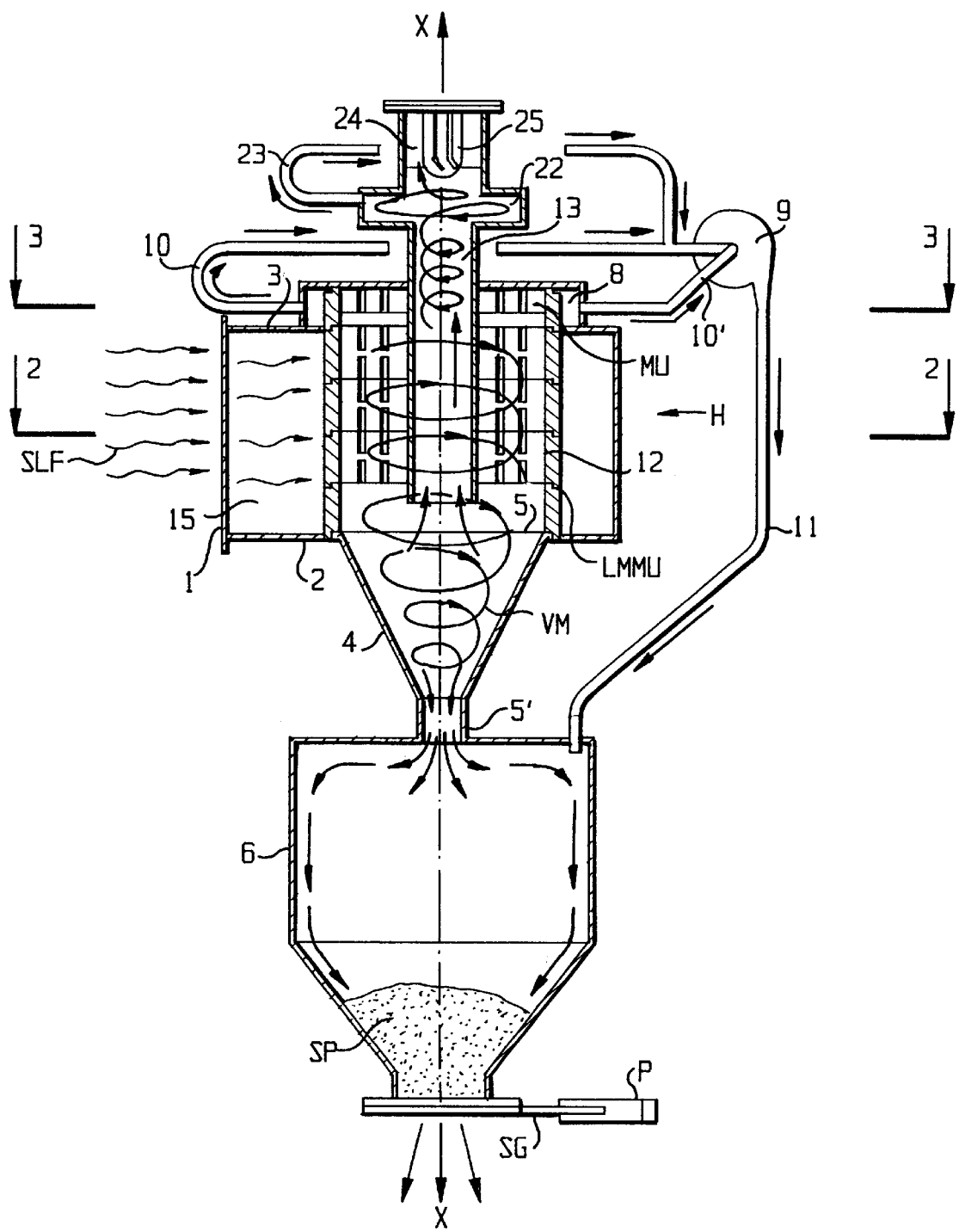
FIG. 1 is a schematic presentation of the separator in accordance with the present invention.
Figure 2:
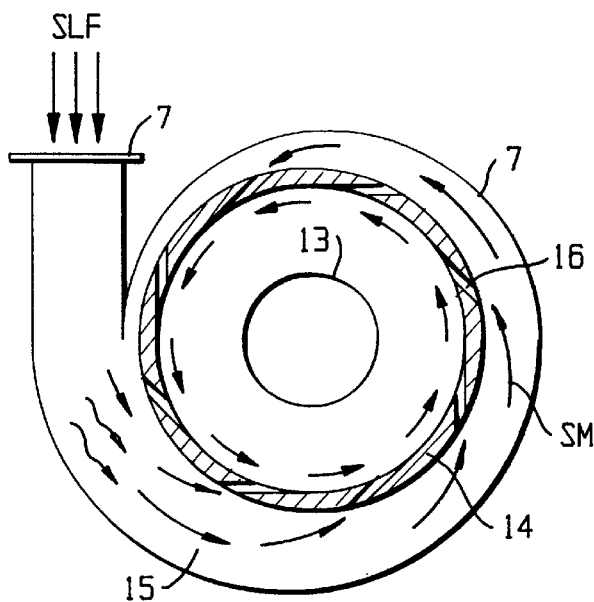
FIGS. 2 and 3 are cross-sectional views of FIG. 1 taken along 1–1 and 2–2, respectively.
Figure 3:
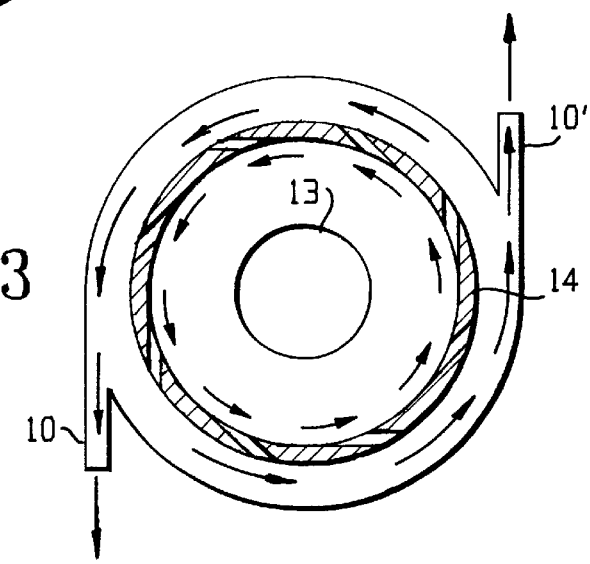

With reference to FIG. 1 the cyclone separator in accordance with the present invention comprises housing H defined by cylindrical peripheral wall 1 thereof. The cylindrical part of the housing has a lower extremity 2, upper extremity 3 and longitudinal axis X—X. Adjacent to the lower extremity 2 of cylindrical part 1 there is formed the conical part 4 of the housing, which is shaped as a truncated inverted cone. The large base 5 of the conical part opens into the cylindrical part of the housing so as to enable communication therebetweeen and thus transfer of separated coarse particulate material with particle size more than 5 microns from the upper cylindrical part into the lower conical part of the housing.

The conical part of the housing is connected via its small base with the collecting receptacle 6 where separated particulate SP is collected. The collected particulate material can be discharged from the receptacle through the bottom part thereof by virtue of the sliding gate SG, which can be periodically opened, for example, by piston P.

There is provided the main ventilator (not shown) for supplying the solid laden fluid further referred to as SLF from the outside atmosphere or from the preceding technological aggregate into the housing. The SLF, for example lime polluted air, or air polluted by cement, carbon or rubber dust enters the housing via inlet pipe 7. The inlet pipe is oriented tangentially with respect to peripheral wall 1 of the housing so as to submit to the entering fluid the initial spinning motion with the linear velocity of at least 20–30 m/sec.

It can be readily appreciated that pipe 7 constitutes an inlet means for the solid laden fluid, while conical part 4 of the housing constitutes an outlet means enabling the collection of separated particulate material.

On the upper extremity 3 of the housing there is mounted the cylindrical chamber 8, which is not in communication with the interior of the housing. The significance and functioning of this chamber will be explained later on in connection with the separating of fine solid particulate. There is provided a suction pump 9, connected with chamber 8 via tangential conduits 10,10' and with collection receptacle 6 via conduit 11.

Within the cylindrical part of the housing there is situated a swirling chamber 12 and central pipe 13. With reference to FIGS. 1–5, showing the first preferred embodiments the swirling chamber is formed as a cylinder, defined by a peripheral wall 14 thereof. The swirling chamber is mounted concentrically with the axis X—X so as to provide for annular space 15 between the inwardly facing surface of the housing and outwardly facing surface of peripheral wall 14 of the swirling chamber.

The peripheral wall of the swirling chamber is provided with a plurality of elongated slit-like openings 16, extending longitudinally and transversally therein. The longitudinal extension of the openings is directed parallel to axis X—X. The transversal extension of the openings is directed substantially tangential with respect to the inwardly facing surface 17 of peripheral wall 14 and concurrent with the direction of spinning motion of the SLF entering the separator. This direction is designated by an arrow SM in FIG. 2.

Figure 4:
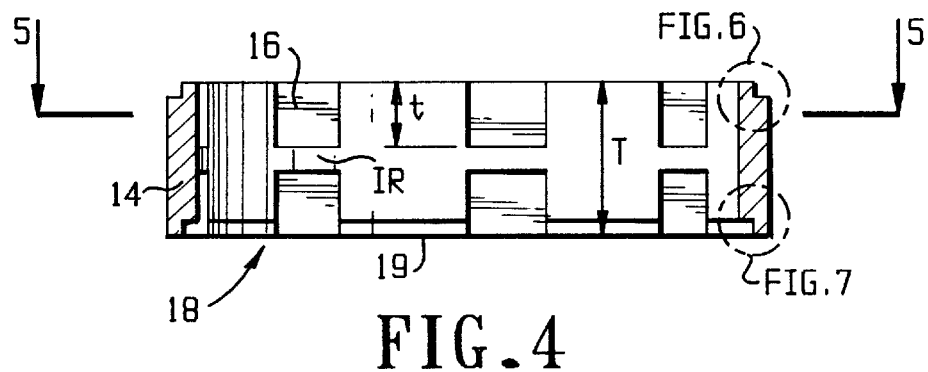
FIG. 4 is an enlarged presentation of a swirling means module.
Figure 5:
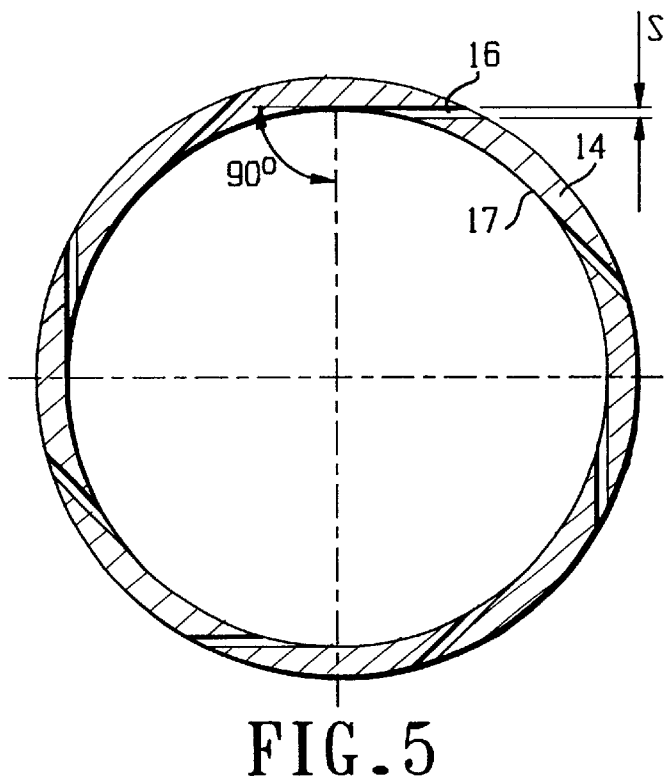
FIG. 5 shows the cross-section view of FIG. 4 taken along line 5–5.
Figure 6:
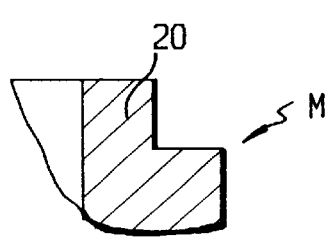
FIGS. 6–7 are enlarged presentations of respective regions of FIG. 4 showing mating means.
Figure 7:
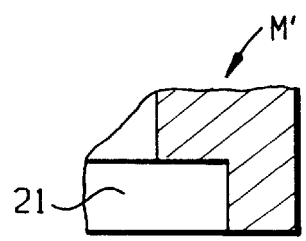

With reference to FIG. 5 it can be seen that openings 16 are arranged regularly within peripheral wall 14 and are defined by their width dimension S. It can also be seen that the openings extend transversally so as to define a 90-degree angle with the inwardly facing cylindrical surface17 of the swirling chamber. In practice it is advantageous if the openings are cut out in the peripheral wall of the swirling chamber by any suitable machining process. It might also be advantageous if the swirling chamber is formed not as a single unit but is assembled from several identical modular ring-like units. With reference to FIGS. 4,5 there is shown one such modular unit designated as 18. The unit is defined by its cylindrical peripheral wall 14 having height T and by respective upper and lower 19 extremities. It can be seen that modular unit 18 is provided with a plurality of slit-like openings 16 located in two opposite regions adjacent to the respective upper or lower extremity of the unit. The openings have length dimension t, which is less than the height of the unit. The regions with openings are divided therebetween by an intermediate region 1R without openings. In order to enable assembling of separate units together they are provided with an appropriate mating means formed respectively on the unit's lower and upper extremities. With reference to FIGS. 6,7 there are shown enlarged details referring to male and female mating means M,M' formed respectively as mating protrusion 20 and depression 21. Since protrusion of one modular unit is formed as insertable within the corresponding depression of the adjacent modular unit the units can be aligned and assembled together.

Within the upper cylindrical chamber 8 there is also mounted one such modular unit MU. However in contrast to the rest of modular units the tangential extension of openings formed in this unit is directed oppositely with respect to the direction of openings made in the lower modular units. The significance of this provision, which can be seen in FIG. 3 will be explained further. The lowermost modular unit of the swirling chamber, which is designated in FIG. 1 as LMMU is formed without openings.

The SLF spinning within the annular space 15 enters the swirling chamber and by virtue of tangentially directed openings 16 is involved in vortical motion.

It has been empirically established that in contrast to the prior art cyclone separators also provided with various swirling means by virtue of the present invention it is possible to create unexpectedly much more intensive vortical motion of the solid laden fluid and thus to improve the efficiency of the separation process.

In practice it has been found that the velocity of vortical motion can be controlled by the total open area provided by openings 16. This area is defined by dimensions and amount of openings 16. These parameters, if chosen properly, should enable achieving the total open area required for increasing the velocity of vortical motion up to 60–100 m/s, which is accompanied by efficient separation of very fine solid particulate with particle size less than 10 microns. In practice it is advantageous if the width dimension S of slit-like openings is 1–5 mm and the length dimension t is 30–120 mm and if the linear velocity of vortical motion is about 70 m/sec.

The achieved result can be explained by the fact that such intensive vortical motion is accompanied by formation adjacent to peripheral wall 14 of stable layer of the SLF. This layer is defined by the pressure gradient. In the middle region of the layer the pressure is low, while in the regions adjacent to the swirling chamber wall it is high. The vortical motion of the SLF can be seen in FIG. 1.where it is schematically designated as VM By virtue of the pressure drop the dust with particle size more than 5 microns is moving towards the lowermost modular unit LMMU. Since this modular unit is not provided with tangential openings the vortical motion is stabilized here and the coarse fraction is effectively separated from the SLF. The separated particles proceed down towards the conical part 4 of the housing and are collected within receptacle 6.

The SLF still carrying middle and fine fraction of the solid particulate with particle size less than 5 micron is expelled by virtue of vortical motion towards chamber 8. Here, due to the opposite direction of tangential openings made in modular unit MU, some retardation of the vortical motion takes place. By virtue of this retardation the medium fraction of the remaining particles of solid particulate having particle size 5-2 microns is separated from the SLF and is driven via conduits 10,10' towards suction pump 9. In practice the capacity of this pump should be 1–5% of the capacity of the main ventilator. It should be appreciated, however, that the suction pump might be not even needed if the driving force generated by the main ventilator is sufficient for moving the SLF.

The SLF still containing the remaining fine particulate fraction with particle size less than 2 microns enters the central pipe 13 and proceeds therethrough up. The central pipe 13 is formed as a tubular member extending coaxially with the axis X—X of the housing. The pipe is located within the housing in such a manner that the lower extremity thereof terminates within the lowermost modular unit LMMU of the swirling chamber. In practice the lowermost end of the pipe should be situated at least 30 mm lower than the penultimate modular unit of the swirling chamber.

The upper extremity of the pipe communicates with a baffle chamber 22, which has an inside diameter larger than that of pipe 13. The baffle chamber is connected with a pump 9 via conduit 23. The remaining fine fraction with particles size 1–2 microns is separated from the SLF within the baffle chamber and is sucked out by pump 9. The separated fine particles follow via a conduit 1 to collection receptacle 6.

Above the buffle chamber and adjacent thereto there is mounted a retardation means 24, formed as a cylindrical chamber having a diameter slightly exceeding the diameter of the central pipe 10 and provided with a plurality of guiding vanes 25 directed oppositely to the direction of vortical motion. By virtue of the retardation means the rest of the fine particulate fraction is separated from the SLF.

Now with reference to FIGS. 8–10 the second embodiment of the swirling chamber of the cyclone separator in accordance with the present invention will be explained.

In this embodiment the swirling chamber is formed as a cage consisting of a plurality of guiding vanes 26 arranged along a circular path CP. The vanes are rigidly fixed between two opposing annular flanges 27,28 and extend in a longitudinal direction along the X—X axis and in transversal direction tangentially with respect to circle path CP. It can be readily appreciated that by virtue of this provision there are provided open spaces between adjacent vanes, which are defined by width dimension S and length dimension t. These spaces are functionally similar to the slit-like openings cut out in the periphery wall of the swirling chamber in accordance with the previous embodiment. Furthermore, similar to the previous embodiment the swirling chamber can also be assembled from several modular units. In order to enable the assembling of units together they are provided appropriate mating means, formed either integrally with flanges 27,28 or as separate elements, which can be affixed to the respective flanges.

Figure 8:
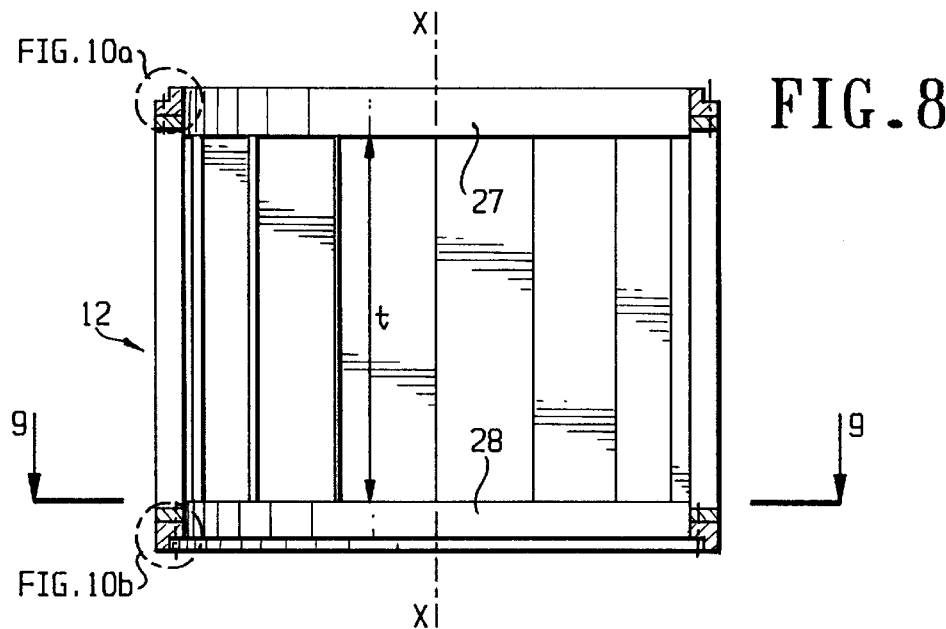
FIG. 8 schematically shows the side view of a swirling means in accordance with the alternative embodiment of the present invention.
Figure 9:
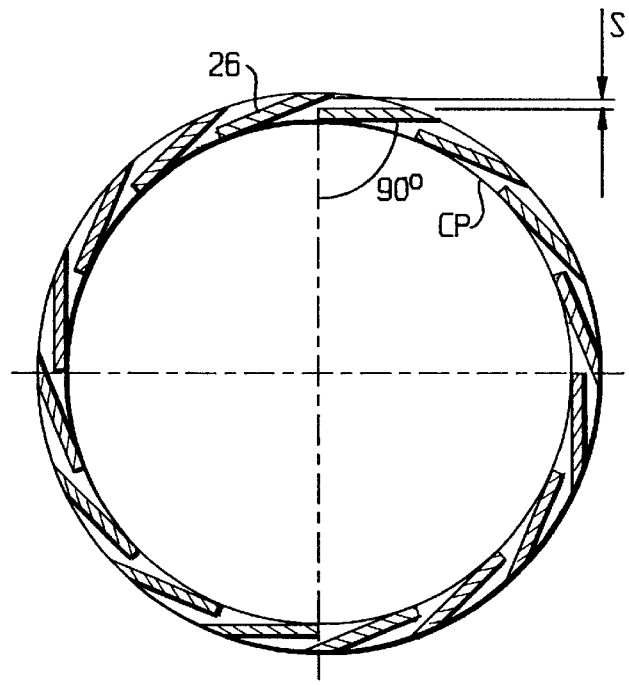
FIGS. 9 is cross-sectional view of FIG. 8 taken along line 9–9.
Figure 10A:
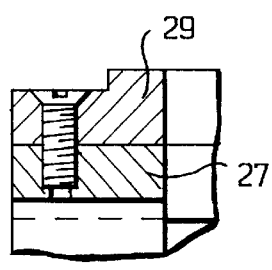
FIGS. 10a,b are enlarged presentations of respective regions of FIG. 8 showing mating means.
Figure 10B:
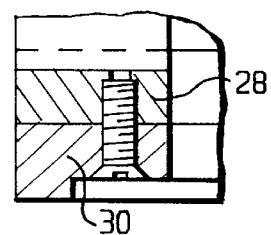
Figure 11:
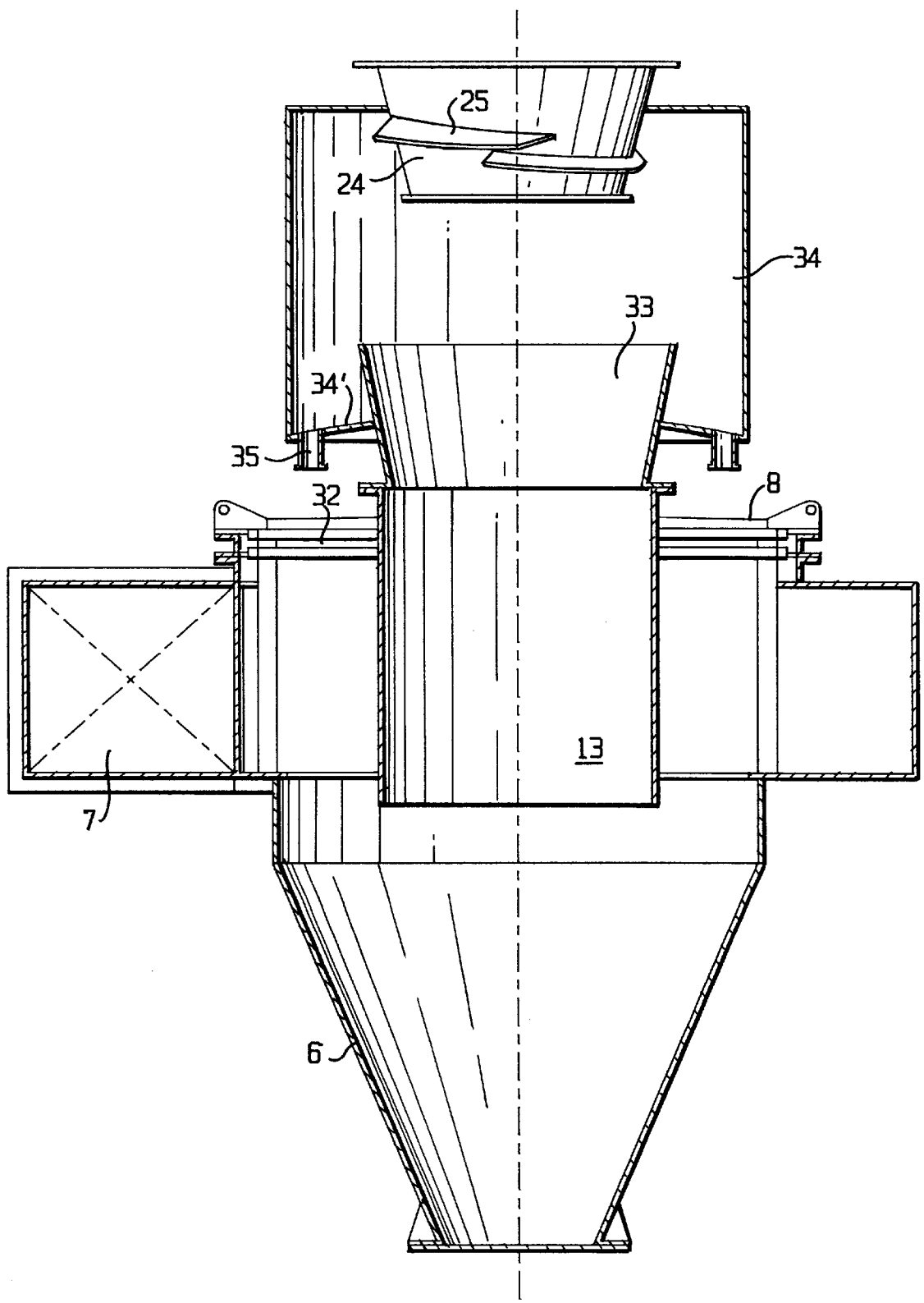

With reference to FIGS. 8,10 *a,b* showing enlarged details one can see the male mounting means formed as a ring with annular protrusion 29. This mating means is fixed on the upper flange for example by a screw. The female mating means is formed as a ring with annular depression 30 and is fixed on the lower flange by a screw.

It can be appreciated that construction of the cyclone separator in accordance with the present invention is very simple, versatile and can be easily manufactured by existing technologies. By virtue of the modular design of the swirling chamber it is possible to control the size of the chamber and thus the compactness of the separator itself. It is also possible to adjust the swirling chamber dimensions so as to enable retrofitting thereof into the existing separator.

The above described cyclone separator is described as a stand-alone unit. It can be easily appreciated that it can also be used as a built in unit within the existing technological line for use in combination with the other separating aggregates.

In practice it is convenient to manufacture the swirling chamber from temperature resistant plastic or metallic material so as to enable reliable operation thereof in cleaning of hot polluted gases emitted during many industrial technological processes.

Figure 12:
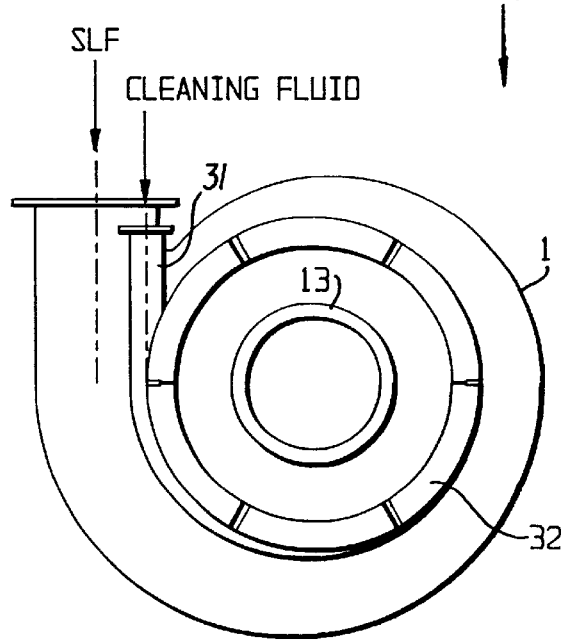
FIGS. 11,12 are the side and top views, respectively, of a separator in accordance with the present invention for use in wet separation.

Now with reference to FIG. 12 a still further preferred embodiment of the present invention will be disclosed. In this embodiment the separation action is stil further improved so as to enable the wet cleaning mode of operation. In practice by virtue of this embodiment it was not only possible to separate dust less than 1 micron but also to simultaneously absorb te toxic gaseous components present in SLF.

With reference to FIG. 12 the upper cylindrical chamber 8 is provided with an inlet 31 for supplying the cleaning liquid thereinto. The inlet is oriented tangentially with respect to the chamber's periphery and enables supplying of cleaning liquid with linear velocity of at least 0.1 m/sec.

There is provided a cleaning liquid distributing means 32 mounted within the chamber instead of modular unit MU. Construction of the liquid distributing means is similar to that of the modular unit MU; however, in contrast thereto the direction of tangential openings thereof coincides with the direction of vortical motion of the SLF. In practice the width dimension of the openings is 2–5 mm.

The central pipe 13 is formed with upper conical extremity 33 opening into the collector chamber 34. The diameter of the collector chamber 34 exceeds the diameter of the central pipe 13 by at least 1.7 times. The bottom part 34' of the collector chamber 34 is slanted so as to enable the flow of liquid separated from the SLF toward the collector's periphery. Here outlets 35 are provided enabling drainage of separated liquid into an appropriate container (not shown).

The retardation means 24 is mounted within the collector chamber and is in communication therewith so as to enable passage of the SLF via the guiding vanes 25. The SLF, for example, the air polluted by toxic gaseous contaminants and by solid particles, mixes with the cleaning liquid entering chamber 8 via inlet 31. Here a stable foamed layer structure is formed, which is involved in a rotating movement by virtue of the vortical motion imparted to the air. Polluted air bubbles through the cleaning fluid and here a major part of the solid particles and gas contaminants is absorbed due to the large contact area between the gaseous and liquid phases involved in heat and mass exchange.

Clean air proceeds up through collector chamber 34 towards the retardation means 24. The air is dried while passing through the collection chamber and droplets of residual liquid are falling down to the bottom part 34' and then removed via inlets 35.

In non limiting table 1 below there are summarized dimensions, capacities and efficiencies of cyclone separators provided with a swirling chamber in accordance with the present invention. The separators were tested in dry and wet cleaning of polluted air emitted in the industrial lime burning process. In the table the following designations are used:

C—capacity of the separator in cub.m per hour
D—outside diameter of the swirling chamber in mm
h—total height of the swirling chamber in mm
n—amount of openings formed in the peripheral wall of the swirling chamber
S—width dimension of openings in mm
V—linear velocity of the vortical motion of the air within the swirling chamber in m/sec
$E_d$—efficiency of dry separation of dust with particle size 1–2 microns in percents
$E_w$—efficiency of wet separation of dust with particle size 1–2 microns in percents

TABLE 1

| C | D | h | n | S | V | $E_d$ | $E_w$ |
|---|---|---|---|---|---|---|---|
| 100 | 232 | 150 | 16 | 2 | 70 | 95 | 97 |
| 5000 | 460 | 300 | 32 | 2 | 70 | 95 | 97 |
| 30000 | 1500 | 800 | 48 | 3 | 70 | 95 | 97 |

For the sake of comparison it can be mentioned that efficiency of separation of the fine dust with particles size 1–2 microns achievable in conventional scrubbers is 75–80%, and in multi cyclones, only 50%.

It should be appreciated that the present invention is not limited by the above-described embodiments and that changes and modifications can be made by one ordinarily skilled in the art without deviation from the scope of the invention as will be defined below in the appended claims.

It should also be appreciated that features disclosed in the foregoing description, and/or in the following claims, and/or in the accompanying drawings, and/or examples, and/or tables may, both separately and in any combination thereof, be material for realizing the present invention in diverse forms thereof.

We claim:

1. A cyclone separator generally for separation of particulate matter from solid laden fluid by virtue of vortical motion thereof; said separator comprising a housing defined by a cylindrical peripheral wall thereof and by upper and lower extremities, said housing having a longitudinal axis and being provided with at least one inlet opening for receiving said solid laden fluid thereinto, said inlet opening being formed within said peripheral wall and being directed tangentially with respect thereto, an outlet means for discharging separated solid particulate from said housing, said outlet means being formed as a hollow truncated cone having a large base and a spaced apart small base, the large base thereof being in communication with the lower extremity of said housing and the small base thereof being in communication with appropriate collecting receptacle, a pipe means for evacuating the clean fluid from said housing, said pipe means being placed within said housing coaxially with the longitudinal axis, an uppermost extremity of the pipe means being located outside of the housing and a lowermost extremity of the pipe means being located within the housing, at least one swirling means for imparting vortical motion to said fluid, said swirling means being formed as a tubular member, mounted within said housing coaxially with longitudinal axis of said housing so as to provide for annular space therebetween, said tubular member being provided with a plurality of slit-like openings, formed in the periphery thereof so as to enable communication between said annular space and the interior of said tubular member, wherein said pipe means extends along the swirling means and said openings are arranged regularly on periphery of said member so as to extend substantially tangentially with respect to the interior thereof, wherein said openings are defined by a length and width dimension being chosen so as to provide for the total open area which is sufficient for imparting to the fluid entering the interior of said swirling means of intensive vortical motion, wherein said tubular member is assembled from at least two modular units, each of said units being defined by a cylindrical peripheral wall thereof and by opposing upper and lower annular extremities thereof, wherein said slit-like openings are formed in peripheral wall of said modular units and their upper and lower extremities are provided with a mating means for assembling said modular units.

2. A cyclone separator as defined in claim 1, wherein the length dimension of said openings is parallel to said longitudinal axis.

3. A cyclone separator as defined in claim 1, wherein said mating means are formed as a protrusion and depression arranged respectively on said upper and lower opposite extremities of said modular units, wherein annular protrusion of one modular unit is insertable within the corresponding annular depression of the adjacent modular unit.

4. A cyclone separator as defined in claim 1, wherein the openings of each modular unit are formed in two opposite regions of said periphery wall and are separated therebetween by an intermediate region, one of said opposite regions being adjacent to the upper extremity of said modular unit and the other opposite region being adjacent to the opposite lower extremity thereof.

5. A cyclone separator as defined in claim 2, wherein said swirling means is formed with plurality of vanes, said vanes being arranged regularly along a circular path, tangentially with respect thereto and said openings are formed by open spaces between the adjacent vanes.

6. A cyclone separator as defined in claim 1, wherein said housing is provided with a baffle means for evacuating of fine and medium particular separated from said fluid, said baffle means being formed as a cylindrical chamber having a diameter exceeding the diameter of said swirling means, said baffle means being mountable on the upper extremity of said housing so as to be in communication with the interior of said swirling means.

7. A cyclone separator as defined in claim 1, wherein said pipe means is provided with a baffle chamber for evacuating fine particulate separated from said fluid, said baffle chamber having a diameter exceeding the diameter of said pipe means.

8. A cyclone separator as defined in claim 7, wherein said pipe means is provided with a retardation means for retardation of the vortical motion of said fluid, said retardation means is mounted above said baffle chamber and provided with guiding vanes directed oppositely to the direction of the vortical motion of said fluid.

9. A cyclone separator as defined in claim 1, further including a liquid distributing means for wet cleaning of said fluid, said liquid distributing means being formed as a cylindrical chamber mountable on the upper extremity of said housing and being in communication with the interior of said housing, said cylindrical chamber being provided with liquid supplying inlets for supplying said liquid thereinto.

10. A cyclone separator as defined in claim 1, wherein said vortical motion has a linear velocity of 60–100 m/sec.

11. A cyclone separator generally for separation of particulate matter from solid laden fluid by virtue of vortical motion thereof; said separator comprising a housing defined by a cylindrical peripheral wall thereof and by upper and lower extremities, said housing having a longitudinal axis and being provided with at least one inlet opening for receiving said solid laden fluid thereinto, said inlet opening being formed within said peripheral wall and being directed tangentially with respect thereto, an outlet means for discharging separated solid particular from said housing, said outlet means being formed as a hollow truncated cone having a large base and a spaced apart small base, the large base thereof being in communication with the lower extremity of said housing and the small base thereof being in communication with appropriate collecting receptacle, a pipe means for evacuating the clean fluid from said housing, said pipe means being placed within said housing coaxially with the longitudinal axis, an uppermost extremity of the pipe means being located outside of the housing and a lowermost extremity of the pipe means being located within the housing, at least one swirling means for imparting vortical motion to said fluid, said swirling means being formed as a tubular member, mounted within said housing coaxially with longitudinal axis of said housing so as to provide for annular space therebetween, said tubular member being provided with a plurality of slit-like openings, formed in the periphery thereof so as to enable communication between said annular space and the interior of said tubular member, wherein said pipe means extends along the swirling means and said openings are arranged regularly on periphery of said member so as to extend substantially tangentially with respect to the interior thereof, wherein said openings are defined by a length and width dimension being chosen so as to provide for the total open area which is sufficient for imparting to the fluid entering the interior of said swirling means of intensive vortical motion, wherein said housing is provided with a baffle means for evacuating of fine and medium particular separated from said fluid, said baffle means being formed as a cylindrical chamber having a diameter exceeding the diameter of said swirling means, said baffle means being mountable on the upper extremity of said housing so as to be in communication with the interior of said swirling means.

12. A cyclone separator as defined in claim 11, wherein the length dimension of said openings is parallel to said longitudinal axis.

13. A cyclone separator as defined in claim 11, wherein said tubular member is assembled from at least two modular units, each of said units being defined by a cylindrical peripheral wall thereof and by opposing upper and lower annular extremities thereof, wherein said slit-like openings are formed in peripheral wall of said modular untis and their upper and lower extremities are provided with a mating means for assembling said modular units.

14. A cyclone separator as defined in claim 13, wherein said mating means are formed as a protrusion and depression arranged respectively on said upper and lower opposite extremities of said modular units, wherein annular protrusion of one modular unit is insertable within the corresponding annular depression of the adjacent modular unit.

15. A cyclone separator as defined in claim 13, wherein the openings of each modular unit are formed in two opposite regions of said periphery wall and are separated therebetween by an intermediate region, one of said opposite regions being adjacent to the upper extremity of said modular unit and the other opposite region being adjacent to the opposite lower extremity thereof.

16. A cyclone separator as defined in claim 12, wherein said swirling means is formed with plurality of vanes, said vanes being arranged regularly along a circular path, tangentially with respect thereto and said openings are formed by open spaces between the adjacent vanes.

17. A cyclone separator as defined in claim 11, wherein said pipe means is provided with a baffle chamber for evacuating fine particulate separated from said fluid, said baffle chamber having a diameter exceeding the diameter of said pipe means.

18. A cyclone separator as defined in claim 17, wherein said pipe means is provided with a retardation means for retardation of the vortical motion of said fluid, said retardation means is mounted above said baffle chamber and provided with guiding vanes directed oppositely to the direction of the vortical motion of said fluid.

19. A cyclone separator as defined in claim 11, further including a liquid distributing means for wet cleaning of said fluid, said liquid distributing means being formed as a cylindrical chamber mountable on the upper extremity of said housing and being in communication with the interior of said housing, said cylindrical chamber being provided with liquid supplying inlets for supplying said liquid thereinto.

20. A cyclone separator as defined in claim 11, wherein said vortical motion has a linear velocity of 60–100 m/sec.

21. A cyclone separator generally for separation of particulate matter from solid laden fluid by virtue of vortical motion thereof; said separator comprising
- a housing defined by a cylindrical peripheral wall thereof and by upper and lower extremities, said housing having a longitudinal axis and being provided with at least one inlet opening for receiving said solid laden fluid thereinto, said inlet opening being formed within said peripheral wall and being directed tangentially with respect thereto,
- an outlet means for discharging separated solid particular from said housing, said outlet means being formed as a hollow truncated cone having a large base and a spaced apart small base, the large base thereof being in communication with the lower extremity of said housing and the small base thereof being in communication with appropriate collecting receptacle,
- a pipe means for evacuating the clean fluid from said housing, said pipe means being placed within said housing coaxially with the longitudinal axis, an uppermost extremity of the pipe means being located outside of the housing and a lowermost extremity of the pipe means being located within the housing,
- at least one swirling means for imparting vortical motion to said fluid, said swirling means being formed as a tubular member, mounted within said housing coaxially with longitudinal axis of said housing so as to provide for annular space therebetween, said tubular member being provided with a plurality of slit-like openings, formed in the periphery thereof so as to enable communication between said annular space and the interior of said tubular member,
  - wherein said pipe means extends along the swirling means and said openings are arranged regularly on periphery of said member so as to extend substantially tangentially with respect to the interior thereof, wherein said openings are defined by a length and width dimension being chosen so as to provide for the total open area which is sufficient for imparting to the fluid entering the interior of said swirling means of intensive vortical motion, wherein said pipe means is provided with a baffle chamber for evacuating fine particulate separated from said fluid, said baffle chamber having a diameter exceeding the diameter of said pipe means.

22. A cyclone separator as defined in claim 21, wherein the length dimension of said openings is parallel to said longitudinal axis.

23. A cyclone separator as defined in claim 21, wherein said tubular member is assembled from at least two modular units, each of said units being defined by a cylindrical peripheral wall thereof and by opposing upper and lower annular extremities thereof, wherein said slit-like openings are formed in peripheral wall of said modular untis and their upper and lower extremities are provided with a mating means for assembling said modular units.

24. A cyclone separator as defined in claim 23, wherein said mating means are formed as a protrusion and depression arranged respectively on said upper and lower opposite extremities of said modular units, wherein annular protrusion of one modular unit is insertable within the corresponding annular depression of the adjacent modular unit.

25. A cyclone separator as defined in claim 23, wherein the openings of each modular unit are formed in two opposite regions of said periphery wall and are separated therebetween by an intermediate region, one of said opposite regions being adjacent to the upper extremity of said modular unit and the other opposite region being adjacent to the opposite lower extremity thereof.

26. A cyclone separator as defined in claim 22, wherein said swirling means is formed with plurality of vanes, said vanes being arranged regularly along a circular path, tangentially with respect thereto and said openings are formed by open spaces between the adjacent vanes.

27. A cyclone separator as defined in claim 21, wherein said housing is provided with a baffle means for evacuating of fine and medium particular separated from said fluid, said baffle means being formed as a cylindrical chamber having a diameter exceeding the diameter of said swirling means, said baffle means being mountable on the upper extremity of said housing so as to be in communication with the interior of said swirling means.

28. A cyclone separator as defined in claim 21, wherein said pipe means is provided with a retardation means for retardation of the vortical motion of said fluid, said retardation means is mounted above said baffle chamber and provided with guiding vanes directed oppositely to the direction of the vortical motion of said fluid.

29. A cyclone separator as defined in claim 21, further including a liquid distributing means for wet cleaning of said fluid, said liquid distributing means being formed as a cylindrical chamber mountable on the upper extremity of said housing and being in communication with the interior of said housing, said cylindrical chamber being provided with liquid supplying inlets for supplying said liquid thereinto.

30. A cyclone separator as defined in claim 21, wherein said vortical motion has a linear velocity of 60–100 m/sec.

* * * * *